March 15, 1966      J. R. KIEL      3,240,059

AERODYNAMIC FORCE MOMENT INDICATOR

Filed Aug. 5, 1963      4 Sheets-Sheet 1

INVENTOR.
J. RIPLEY KIEL

ATTORNEYS

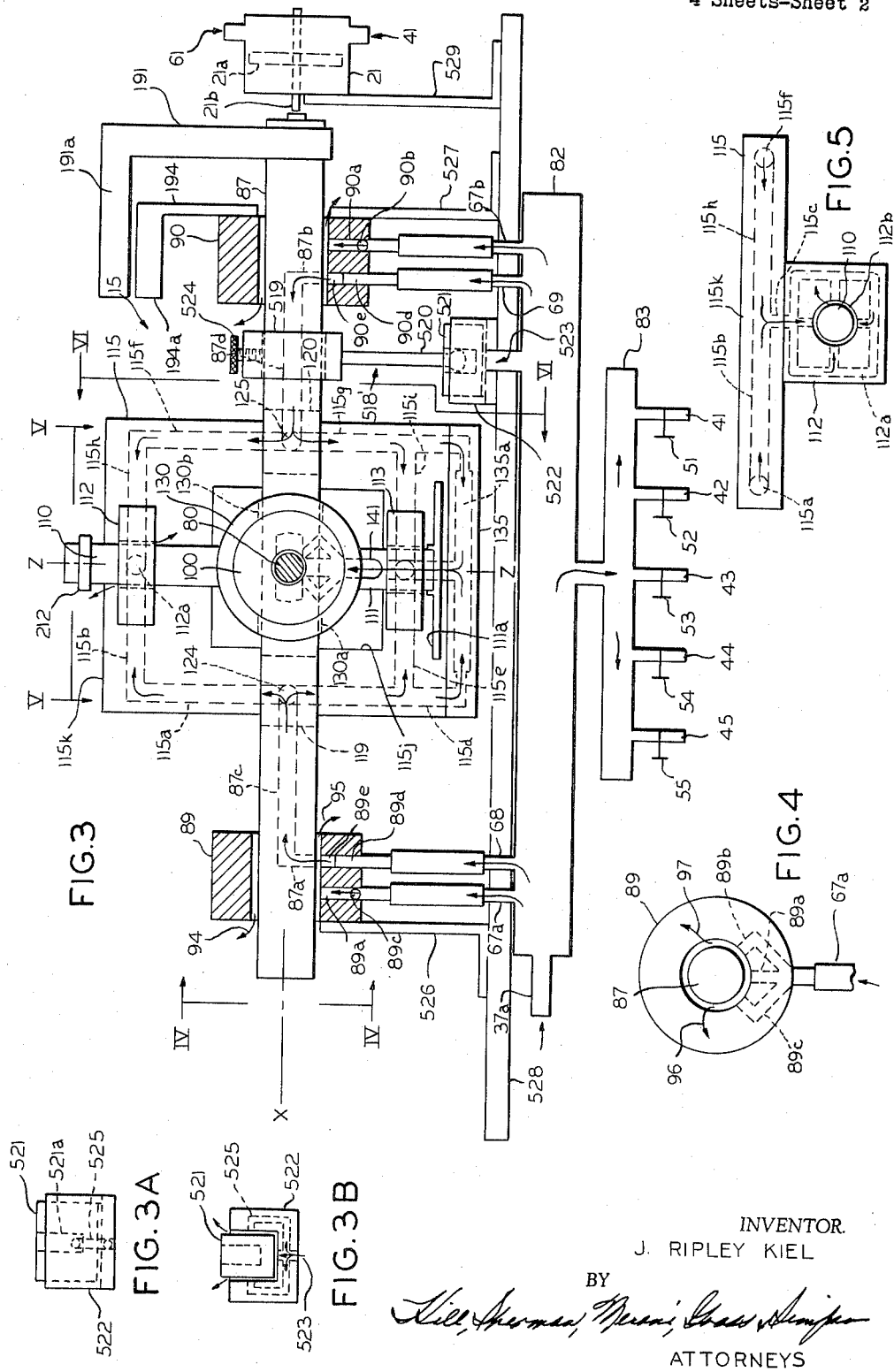

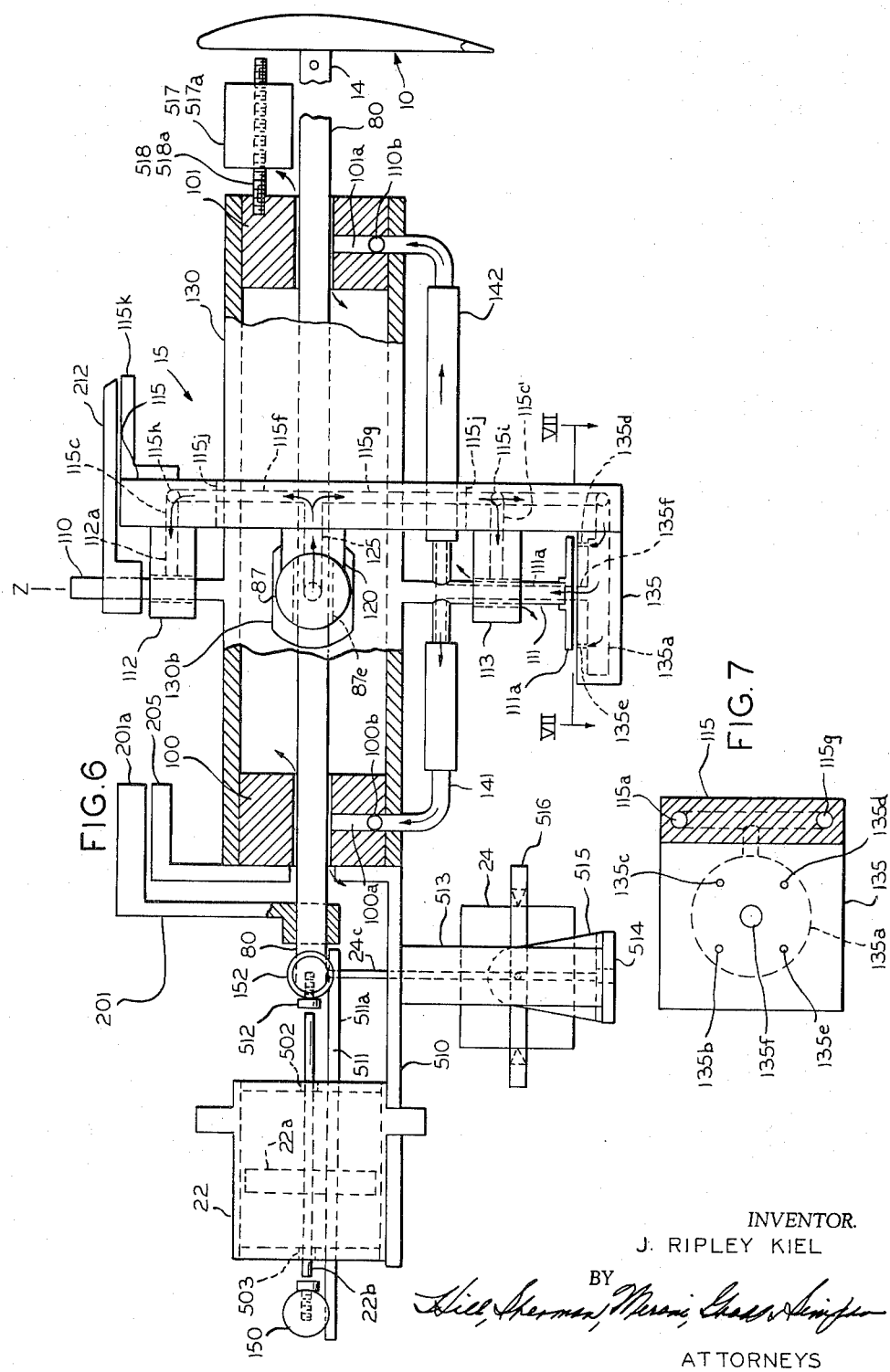

March 15, 1966
J. R. KIEL
3,240,059
AERODYNAMIC FORCE MOMENT INDICATOR
Filed Aug. 5, 1963
4 Sheets-Sheet 4
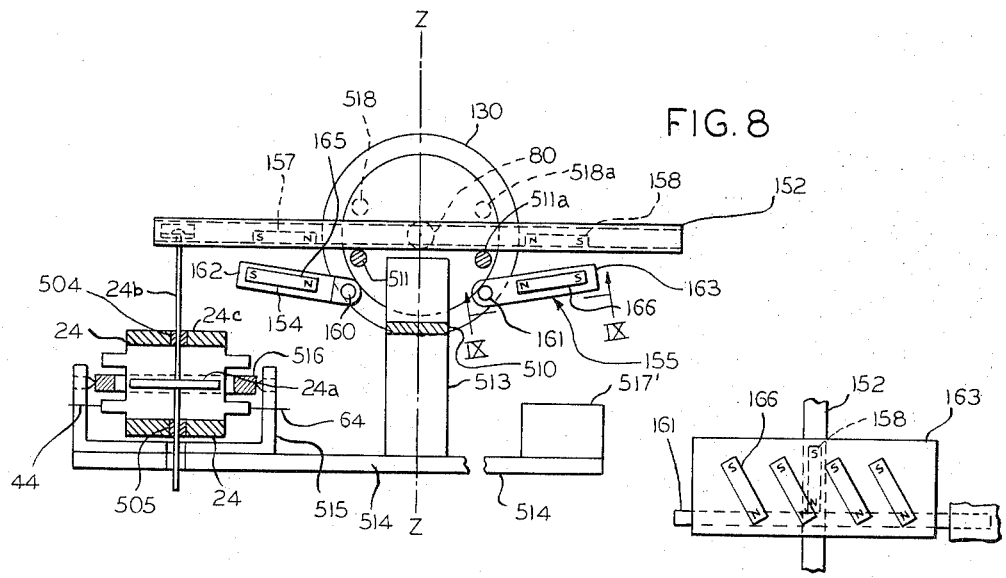
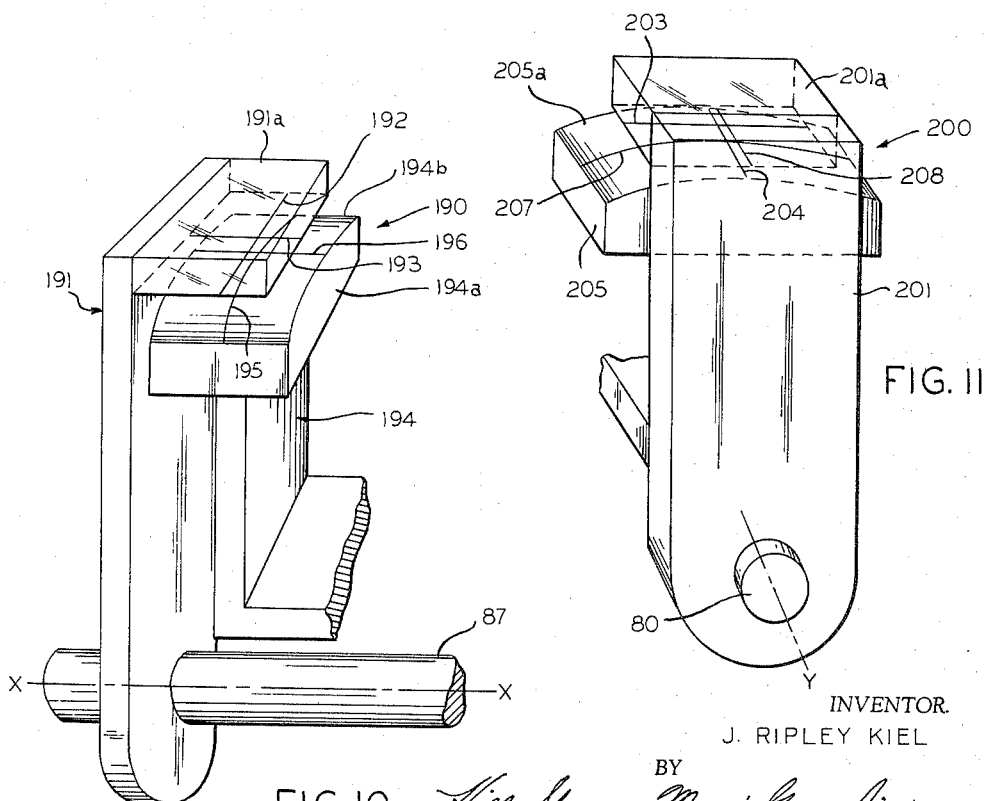
INVENTOR.
J. RIPLEY KIEL
BY
ATTORNEYS United States Patent Office 3,240,059
Patented Mar. 15, 1966

3,240,059
AERODYNAMIC FORCE MOMENT INDICATOR
John Ripley Kiel, Delray Beach, Fla., assignor to Scott Aviation Corporation, Lancaster, N.Y., a corporation of New York
Filed Aug. 5, 1963, Ser. No. 299,923
10 Claims. (Cl. 73—147)

This invention relates to a method and apparatus for measuring any system of forces in one plane and any system of moments about three axes applied to a body.

The invention particularly relates to measurement of forces and moments developed by an aerodynamic body subjected to a stream of air.

It is an important object of the present invention to provide a method and apparatus for measuring simultaneously or individually the forces and moments exerted by an aerodynamic body when immersed in a stream of air and particularly to a model or miniaturized airfoil or section thereof.

A further important object of the present invention is to provide an apparatus for measuring forces and moments which eliminates friction to a maximum degree in all moving mechanical parts.

A further object of the invention is to provide a novel force measurement system having novel means for statically balancing the system with respect to the body under test.

Other objects, features and advantages of the present invention will be apparent from the following detailed description taken in connection with the accompanying drawings in which:

FIGURE 3 is a somewhat diagrammatic elevational view showing certain details of the system of FIGURE 2;

FIGURE 3A is a detail elevational view of the sliding block and slide member shown in FIGURE 3;

FIGURE 3B is an end elevational view of the components of FIGURE 3A;

FIGURE 4 is a fragmentary end elevational view taken as indicated by the line IV—IV in FIGURE 3;

FIGURE 5 is a fragmentary top plan view taken as indicated by the line V—V in FIGURE 3;

FIGURE 6 is a vertical sectional view taken generally along the line VI—VI in FIGURE 3;

FIGURE 7 is a horizontal sectional view taken generally along the line VII—VII in FIGURE 6;

FIGURE 8 is a somewhat diagrammatic elevational view showing a magnetic stabilization means for statically balancing the weight of the body under test;

FIGURE 9 is a fragmentary bottom plan view generally as indicated by the line IX—IX in FIGURE 8;

FIGURE 10 is a fragmentary enlarged view of the crossed index indicator associated with the X axis of the system of FIGURE 2; and FIGURE 11 is an enlarged perspective view illustrating the crossed index indicator means associated with the Y axis of the system of FIGURE 2.

The apparatus is shown in use with a small model of an airfoil such as an airplane wing; however, the apparatus is not limited to the measurement of forces and moments associated with such a specimen. The apparatus can be readily applied to a miniaturized jet propulsion device which will produce forces within the capabilities of the apparatus to measure.

Figure 1:
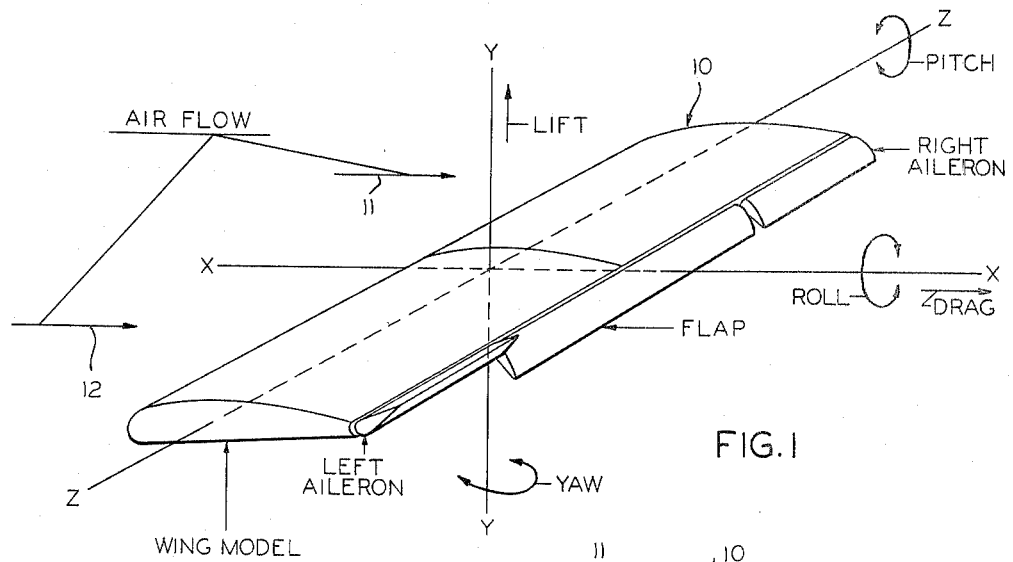
FIGURE 1 is a perspective view of an airfoil section and showing the forces and moments which might be produced with respect to three mutually orthogonal axes.
Figure 2:
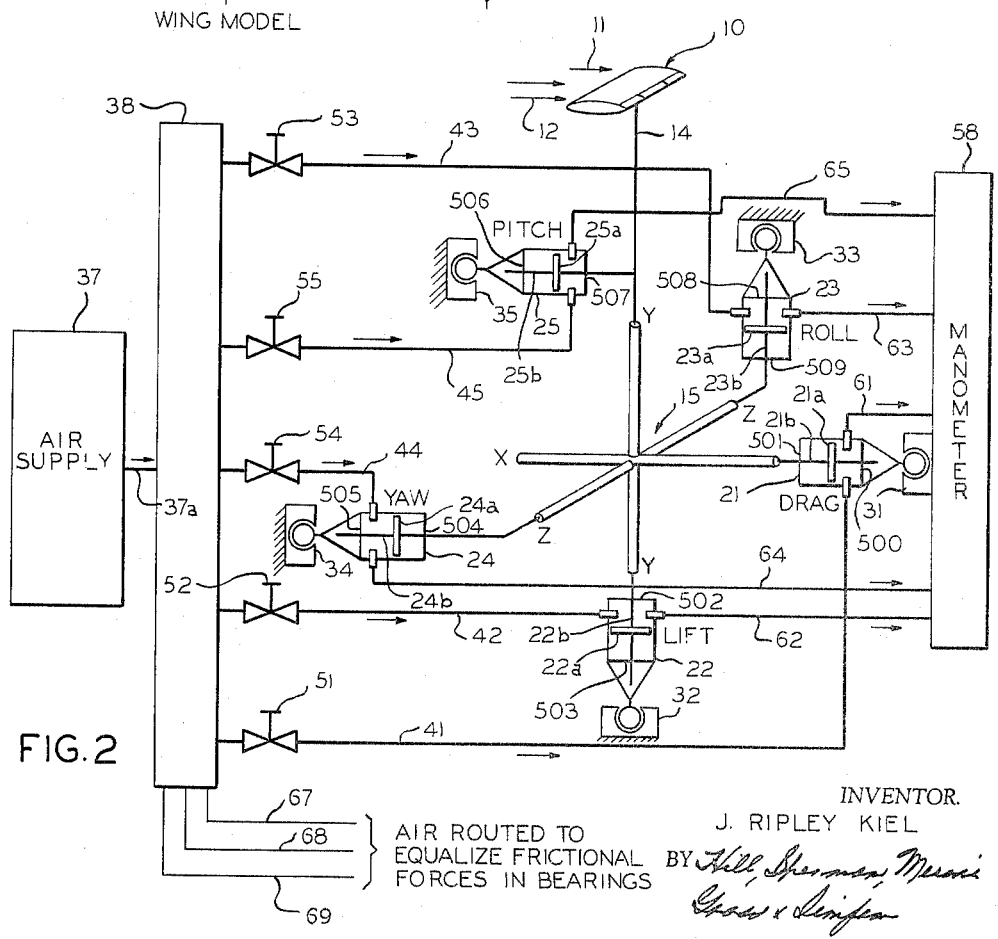
FIGURE 2 is an isometric schematic view of a force measuring system in accordance with the present invention.

In FIGURE 1, a wing model 10 is illustrated as being subjected to air flow in the direction of arrows 11, 12 to produce forces with respect to the X, Y and Z axes as indicated in FIGURE 1;

Referring to FIGURE 2, the airfoil model 10 is shown connected with a support 14 extending in the direction of the Y axis. A balance means generally indicated at 15 is provided for resolving the forces exerted on the body 10 into a drag force component along the X axis, a lift force component along the Y axis, a roll moment tending to produce rotation about the X axis, a yaw moment tending to produce rotation about the Y axis and a pitch moment tending to produce rotation about the Z axis. The various force and moment components transmitted to the balance means 15 are resisted by respective force measurement means 21–25. In the illustrated embodiment, the force measurement devices 21–25 constitute load cells and preferably comprise load cells of the type disclosed in a copending application of Fredric E. Flader, Serial No. 299,919 and filed of even date herewith. The disclosure of said copending application is incorporated herein by reference for a disclosure of a suitable load cell for use with the present system. Generally, load cells 21–25 may comprise cylindrical housings having respective loosely fitting piston members 21a–25a therein including rods 21b–25b coupled to the means 15 and guided for axial movement by suitable bearing means 500–509 in the ends of the cylindrical housings. Securing means 31–35 allow a substantial universal movement of the cylindrical housings and their respective pistons in response to movement of balance means 15 from an initial position. Air from a regulated air supply 37 is supplied to a manifold 38 and then via lines 41–45 to the appropriate side of the respective pistons 21a–25a so as to restore the balance means 15 to the initial position. The supply of air pressure to the respective load cells is controlled by means of manually actuated valves 51–55. In the illustrated embodiment, one side of each piston receives pressure from the manifold 38 while the opposite side of the piston is maintained substantially at atmospheric pressure. The high pressure sides of the respective pistons are coupled to respective indicating tubes of a manometer 58 by means of lines 61–65. With the pistons receiving sufficient pressure from manifold 38 to maintain the balance means 15 in its initial position, the tubes of manometer 58 will indicate values representative of the respective forces and moments exerted by the load cells on the balance means 15 which are required to maintain a dynamic equilibrium.

Additional air pressure lines are indicated at 67, 68 and 69 which as will hereinafter be described supply air to equalize frictional forces in the bearings.

FIGURE 3 illustrates a specific preferred arrangement of the balance means 15 of FIGURE 2 wherein it will be noted that the Z axis of the balance means corresponds with the vertical direction as viewed in FIGS. 3, 6, and 8. With this orientation, the body 10 will be carried on a horizontal (as viewed in FIGS. 3, 6, and 8) Y axis coinciding with the axis of shaft 80 in FIGURE 3. The horizontal disposition of the shaft 80 and its connection via support 14 with the body 10 under test is illustrated in FIGURE 6.

Referring to FIGURE 3, it will be understood that air from air supply 37 is supplied to manifold 82 and then to manifold 83 and from manifold 83 through valves 51–55 to lines 41–45 of load cells 21–25 in general correspondence with the diagrammatic showing in FIGURE 2. The input air conduit from supply 37 is indicated diagrammatically at 37a in FIGURE 3 and it will be understood that the two chambers or manifold sections 82 and 83 in FIGURE 3 correspond substantially to the manifold diagrammatically indicated at 38 in FIGURE 2. The air supply lines 67, 68, and 69 from manifold 38 in FIGURE 2 correspond to the supply lines 67a, 67b, 68 and 69 from manifold section 82 in FIGURE 3.

As seen in FIGURE 3, a shaft 87 has its axis coinciding with the X axis of FIGURES 1 and 2 and is mounted in bearings indicated at 89 and 90 receiving air under pressure from lines 67a and 67b. As shown in FIGURE 4, the line 67a connects with passages 89a, 89b and 89c within the bearing 89 so that the air discharged against the shaft 87 tends to support the shaft and to center the same within the bearing 89. The lifting forces exerted by air from channels 89b and 89c are directed at an angle of approximately 45° to the vertical so as to provide an optimum centering force on the shaft 87 in conjunction with the lifting force exerted by the air flow in all three passages. Air escapes from the bearings as indicated by arrows 94 and 95 in FIGURE 3 and 96 and 97 in FIGURE 4, for example. Bearing 90 preferably has an arrangement of three passages corresponding to those indicated in FIGURE 4 including a center passage 90a and 45° passages at each side thereof such as 90b. Similarly, the shaft 80 is supported by bearings 100 and 101 having passages including vertical passages 100a and 101a arranged as indicated in FIGURE 4 to provide a supporting and centering action with respect to the horizontal shaft 80.

Air from lines 68 and 69 is delivered to passages 89d and 90d in bearings 89 and 90. The passages 89d and 90d may connect with arcuate grooves 89e and 90e registering with radial passages 87a and 87b in shaft 87 regardless of the angular position of shaft 87 within its normal range of angular movement. Excess air delivered to grooves 89e and 90e escapes through the clearances between shaft 87 and bearings 89 and 90, but the pressure of this diverted air while assisting in lifting the shaft 87 from mechanical contact with bearings 89 and 90 is not sufficient for this purpose without the additional lifting force supplied by air from lines 67a and 67b.

The forces and moments developed by a miniaturized aerodynamic body such as indicated at 10 may be very small and consequently the provision of sleeves of air and the prevention of mechanical contact at the bearings is an important part of the invention.

The Z axis shaft means include an upper shaft 110 and a lower shaft 111 journalled in brackets 112 and 113 carried by a mounting plate 115. The mounting plate 115 is secured to the X axis shaft 87 by means of connecting pieces 119 and 120, FIGURE 3, the connecting piece 120 being shown in solid outline in FIGURE 6. Air is supplied to the clearance spaces between Z axis journals 112 and 113 and Z axis shafts 110 and 111 from line 68, FIGURE 3, via line 89d, groove 89e, radial section 87a and longitudinal section 87c of shaft 87, FIGURE 3. A radial passage 124 extends from longitudinal passage 87c through shaft 87 and connecting piece 119 to the mounting plate 115. Here the air is divided and is sent through passages 115a and 115d to horizontal passages 115b and 115e. Horizontal passage 115b leads to a horizontal passage 115c, FIGURE 5, which in turn leads to a network of passages 112a in journal 112, FIGURE 5. Similarly, horizontal passage 115e leads to a horizontal passage 115c' as seen in FIGURE 6 which in turn leads to a network of passages in journal 113. Bearings 112 and 113 being identical, only the passages for bearing 112 have been shown in FIGURE 5. The network of passages generally designated by the reference numeral 112a in FIGURE 5 lie in a horizontal plane and lead to the clearance space between bearing 112 and shaft 110 by four passages separated by angels of 90° about the periphery of shaft 110. The vertical shaft 110 is thus substantially centered within the aperture 112b of bearing bracket 112 and is maintained out of mechanical contact with the bearing surface providing aperture 112b.

Additional air is supplied to bearings 112 and 113 by air pressure line 69, FIGURE 3, which leads via passage 90d, goove 90e and radial passage 87b in shaft 87 to a longitudinal passage 87d in shaft 87 and a radial passage 125 extending through shaft 87 and through connecting piece 120 in the mounting plate 115. From radial passage 125, air is supplied via passages 115f and 115g to the respective bearingse 112 and 113 via horizontal passages 115h and 115i and 115c, FIGURE 5, and 115c', FIGURE 6. The passage 115h connects with the horizontal passage 115c as indicated in FIGURE 6 and a corresponding arrangement is present with respect to bearing 113 with connecting passages 115i and 115c'.

The shafts 110 and 111 carry a mounting sleeve 130, FIGURE 3, for the Y axis shaft 80, and the mounting plate 115 is provided with a central aperture 115j accommodating pivotal movement of the mounting sleeve 130 about the Z axis corresponding to the axis of shafts 110 and 111. Similarly, the mounting sleeve 130 is provided with elongated slots 130a and 130b receiving the shaft 87 and accommodating the pivotal movement of the mounting sleeve 130 about the Z axis. The slot 130b is shown in solid outline in FIGURE 6. Further, X axis shaft 87 has an elongated slot 87e therein accommodating pivotal movement of the Y axis shaft 80 with its mounting sleeve 130.

Referring to FIGURES 3 and 6, it will be observed that air passages 115d and 115g connect with a chamber 135a of a base part 135 underlying the lower end of shaft 111 which carries a disk 111a. As seen in FIGURES 6 and 7, base 135 is provided with a series of vertical passages 135b–135e surrounding a central larger cross section passage 135f which together supply a fluid support for the shafts 110 and 111 and the parts connected therewith including sleeve 130 and the Y axis shaft 80. The openings 135b–135e may have diameters of approximately .050 inch and air delivered through these small holes impinges on the disk 111a lifting it from contact with the surface of base 135 to allow shafts 110 and 111 to rotate freely relative to the Z axis.

As seen in FIGURE 6, shaft 111 has a central air passage 111a in registry with the central passage 135f of base 135 so as to deliver air to the bearings 100 and 101 of the horizontal (Y axis) shaft 80 via fluid conduits such as indicated at 141 and 142 in FIGURE 6 which connect with the passages such as 100a and 101a in bearings 100 and 101 which as previously described correspond to the X axis bearing arrangement shown in FIGURE 4. Thus, the Y axis shaft 80 is supported on a cushion of air and is free to move longitudinally and rotatably.

As seen in FIGURE 6, the body 10 under test being mounted at one end of the Y axis shaft 80 will have a weight producing an unequal load on bearings 100 and 101. To equalize this load a weight 150 is attached to shaft 80 by means of cross shaft 152 and members 511 and 511a extending from cross shaft 152 on opposite sides of shaft 80 as indicated in FIGURE 8. This weight is sufficient to balance shaft 80 at a point midway between bearings 100 and 101. Thus the total weight is equally distributed to these bearings and equal air pressure is supplied to each bearing from below. If shaft 80 were not in balance with respect to bearings 100 and 101 it would be necessary to direct air under pressure to the top of bearing 100 as viewed in FIGURE 6 to counteract the moment exerted on shaft 80 by the weight of body 10. The weight 150 is supported by arms 511 and 511a which straddle load cell 22 and are secured at their other ends to shaft 152. The load cell 22 is supported by member 510 which in turn is fastened to bearing 100. Thus pivotal movement of tube 130 carries the load cell 22 and weight 150 therewith. The rod 22b carrying piston 22a exerts a force against the weight 150 to counteract movement of shaft 80 and members 511 and 511a as a result of the lifting effect of airfoil 10, and thus serves to restore shaft 80 to its initial position.

To counteract a moment about the X axis as a result of the addition of weight 150 and other parts, weights 517 and 517a are adjusted along the length of threaded rods 518 and 518a which are mounted in the end of bearing 101 and are located on opposite sides of the vertical plane through shaft 80 as indicated in FIGURE 8. The proper operating positions of weights 517 and 517a are achieved when shaft 80 is horizontal. This position assures an equal thrust against bearings 112 and 113 by shafts 110 and 111.

The body 10 may also be in unbalance with respect to rotation on the Y axis corresponding to the axis of shaft 80 and to counteract this, a cross shaft 152 is connected to the end of shaft 80 as indicated in FIGURES 6 and 8. Attached to member 510 is post 513 which supports cross bar 514 and to which is secured bracket 515 that acts as the bearing for the gimbal ring 516 for supporting load cell 24. This gimbal mounting enables the load cell to move freely in all directions so as to not impede the motion of cross shaft 152 about the Y axis or the longitudinal movement of shaft 80 along Y axis. Being attached indirectly to the sleeve 130, it is free to move with sleeve 130 about the Z axis. To balance the weights of the load cylinder and gimbal assembly, weight 517′, FIGURE 8, is mounted on cross bar 514. This removes any moment about the Y axis which would place an unequal side load on the Z axis shafts 110 and 111 against bearings 112 and 113.

The load cell 24 is coupled to the cross bar 152 for controlling the angular position of the body 10 with respect to the Y axis, and the weight of the piston 24a in the load cell 24 will help to maintain equilibrium in the event of an unbalance in the weight of the body 10 with respect to rotation on the Y axis. If the weight of piston 24a is not sufficient to provide static balance, a magnetic stabilizer assembly 154, 155 may be employed as illustrated in FIGURES 8 and 9. The stabilizer consists of two permanent magnets 157 and 158 secured to the cross arm 152 at equal distances from shaft 80. Positioned under and rotatably adjustable about pivots 160 and 161 which are secured to mounting sleeve 130 are respective stabilizer plates 162 and 163 carrying respective series of permanent magnets 165 and 166. As best seen in FIGURE 9 the magnets such as 166 are positioned at an angle of 45° to the axis of cross arm 152 and are arranged so that the poles of the series of magnets are adjacent the corresponding poles of magnets 157 and 158. The series of magnets 165 and 166 may be cemented to the plates 162 and 163 or molded therein. The plates should be of a non-magnetic material as should the cross arm 152. Thus it can be seen that with no mechanical link between plates 162 and 163 and the cross arm 152 the weight of the body 10 may be balanced statically with respect to rotation about the axis of shaft 80. This may be accomplished by making an angular adjustment of members 162 and 163 relative to their pivots 160 and 161. The repulsive force of the like magnetic poles of magnets 157 and 165 and of magnets 158 and 166 is sufficient to correct any angular displacement due to unbalance of the airfoil body 10. The magnetic stabilizers 154 and 155 thus create no friction to impede the longitudinal movement of shaft 80 along the Y axis.

As seen in FIGURE 3, the vertical shaft along axis Z is not continuous but is divided into two sections 110 and 111 connected to the support tube or sleeve 130. This construction allows shafts 87 and 80 to intersect with the Z axis without any obstruction. Shaft 87 is provided with a clearance passage as indicated at 87e for shaft 80, thereby permitting all of the shafts or axes to effectively pass through a common point of intersection.

FIGURE 10 illustrates a dual action indicator 190 for registering the rotational and translational position of the X axis shaft 87. This indicator comprises a member 191 secured to shaft 87 and comprising a transparent section 191a of Lucite or the like which has engraved cross lines as indicated at 192 and 193. A fixed member 194 has a cooperating part 194a with crossed lines 195 and 196 engraved thereon for registry with the intersection of lines 192, 193 when the shaft 87 is in an original position. The fixed member 194 is supported by a part of the bearing structure 90 which is stationary in the illustrated embodiment. Of course, the clearance between members 191 and 194 is such as to accommodate longitudinal movement of the shaft 87 to the desired degree and rotational movement of the shaft. The surface 194b of member 194 is preferably curved so as to conform with the arcuate travel of member 191a with respect to the X axis. By manipulating valves 51 and 53, FIGURE 2, associated with the load cells 21 and 23, it is possible to return shaft 87 to the initial position determined by the crossed lines under dynamic conditions with air traveling across the surfaces of airfoil 10 as indicated in FIGURE 2.

Similarly a dual indicator 200 is provided including a member 201 secured to the Y axis shaft 80, for example as diagrammatically indicated in FIGURE 6. The member 201 has a transparent block 201a with crossed lines 203 and 204 and cooperates with a relatively fixed member 205 having an arcuate surface 205a with crossed lines 207 and 208 engraved thereon to define an original position of the Y axis shaft 80 with respect to a direction longitudinally of the Y axis and rotationally of the Y axis. The surface 205a is formed on a radius of curvature corresponding to its spacing from the Y axis to correspond with the arcuate travel of block 201a. The fixed member 205 is carried by bearing bracket 100, FIGURE 6. An indicator means 212 is secured to the Z axis shaft section 110 as indicated in FIGURE 6 for cooperating with an index mark on edge face 115k of plate 115 to indicate an original angular position of shaft 110 with respect to plate 115. These parts are not shown in FIGURE 5.

Under some conditions it may be desired to lock out some motions of the machine. The vertical stabilizer 518′, FIGURE 3, locks out the roll motion of shaft 87 without affecting the freedom of movement of the shaft 87 along the X axis for drag measurements. The vertical stabilizer 518′ consists of thumb screw 524 which locks member 519 to shaft 87. Extending downwardly is rod 520 having a ball shaped end which engages a hole 521a, FIGURE 3A, in sliding block 521 operating in slide member 522. Slide block 521 is kept out of frictional contact with slide member 522 by means of air entering from manifold 82 through passage 523, FIGURE 3. The air is distributed to the sides and bottom of slide member 522 by a network of air passages 525, FIGURE 3B. Thus the block 521 slides longitudinally on a cushion of air while at the same time preventing any rotation of shaft 87 about the X axis. To restore the roll motion, thumb screw 524 is turned to unlock member 519 from shaft 87.

As indicated in FIGURE 3 bearings 89 and 90 are supported by members 526 and 527 from base plate 528. Load cell 21 for drag measurements is shown supported by member 529 secured to base 528.

The load cell 23 for the control of roll movement is attached to base 528 by means of a gimbal mount similar to that for load cell 24 which is shown in FIGURE 6. The load cell 25 for control of the pitch moment has its securing means 35 secured to member 115.

Summary of operation

In placing the present system in operation, the balance means 115 is first statically balanced with the body 10 applied to the support 14 of Y axis shaft 80 with respect to the load on bearings 100 and 101. This balance may be achieved by the use of a weight 150 as indicated in FIGURE 6, for example. Weights 517 and 517a, FIGURE 6, are adjusted then to bring shaft 80 to a horizontal position. In the event that the body 10 is not balanced with respect to rotation about the axis Y under static conditions, the stabilizer means 154 and 155, FIGURES 8 and 9, may be angularly adjusted to secure such static balance.

Having established a static balance, air flow as indicated by arrows 11 and 12 in FIGURES 1 and 2 is now established so as to establish dynamic forces on the test body 10 which are to be analyzed by the balance means 15 into various force components. With the dynamic condition established, air flow is regulated by means of valves 51–55 to load cells 21–25, FIGURE 2, so as to restore the balance means 15 to an original position as determined by the index marks 192, 193 associated with the X axis shaft 87 relative to index lines 195, 196 and the corresponding index lines 203, 204 associated with the Y axis shaft 80, FIGURE 11. A similar original position indication is provided by the position indicator means 212 carried on the Z axis shaft section 110, FIGURE 6. With the pressure in the active chambers of each of the load cells 21–25 adjusted to the values required to maintain the body 10 in its initial position, the pressures are read at respective manometer tubes of a manometer component 58, FIGURE 2, which are connected to the active chambers by lines 61–65, FIGURE 2.

During operation of the system, air under pressure from air supply 37, FIGURE 2, is supplied via manifold 82, FIGURE 3, to the bearings 89, 90 of the X axis shaft 87 to support the shaft centrally and out of mechanical contact with the bearings, the air passage arrangement being shown in detail in FIGURE 4. A similar arrangement is provided at bearings 100 and 101, FIGURE 6, with respect to the Y axis shaft 80. The Z or vertical axis shafts 110, 111 are supported by air pressure acting on a disk 111a, FIGURE 6, and the bearings 112 and 113, FIGURE 6, receive air pressure as indicated in detail in FIGURE 5 so as to center shafts 110 and 111 out of mechanical contact with the respective bearings 112 and 113.

The balance means 15 thus resolves the forces acting on the body 10 into five force components with a minimum of error even where the body 10 may be miniaturized and subject to relatively small forces and moments.

It will be apparent that many modifications and variations may be effected without departing from the scope of the novel concepts of the present invention.

I claim as my invention:

1. Apparatus for measuring forces acting on a body comprising a support for the body; resolving means coupled with said support for resolving the forces acting on said body into first and second force components acting along first and second axes, and third, fourth and fifth force components tending to rotate said body about said first axis, said second axis and about a third axis; said means comprising first shaft means having it axis coinciding with said first axis and first bearing means mounting said first shaft means for translation along said first axis and for rotation about said first axis, second shaft means hving it axis coinciding with said second axis, second bearing means mounting said second shaft means for translation along said second axis and for rotation about said second axis, third shaft means having its axis coinciding with said third axis, third bearing means supporting said third shaft means for rotation about said third axis, said third bearing means being carried by said first shaft means, and said third shaft means supporting said second bearing means; and force measurement means for coupling to said first, second and third shaft means to measure the respective force components transmitted thereto from said support.

2. The apparatus of claim 1 with said force measurement means comprising means defining an initial position of said support, a first force applying device coupled to said first shaft means and a second force applying device coupled to said second shaft means to restore said first and second shaft means to their initial positions along said first and second axes respectively, and comprising third and fourth force applying devices acting on said resolving means for rotating said resolving means about said first and second axes respectively and comprising a fifth force applying device acting on said resolving means and tending to rotate said second shaft means about said third axis to tend to restore said body to said initial position.

3. The apparatus of claim 1 with first air passage means for producing an air cushion for said first shaft means at said first bearing means and further air passage means for producing an air cushion for said second shaft means at said second bearing means and for producing an air cushion for said third shaft means at said third bearing means.

4. The apparatus of claim 1 with said third axis coinciding with a vertical direction and support bearing means for supporting said third shaft means, and means for producing an air cushion between said support bearing means and said third shaft means.

5. In combination, means for resolving an applied force into a plurality of force components including first and second force components acting along first and second orthogonally related axes intersecting at a common point and third and fourth force components tending to produce rotation about said second axis and about a third axis intersecting said common point and disposed at right angles to said first and second axes, said resolving means comprising first shaft means having its axis coinciding with said first axis, first bearing means mounting the first shaft means for translation along said first axis, second shaft means having its axis coinciding with said second axis, second bearing means mounting said second shaft means for translation along said second axis and for rotation about said second axis, third shaft means having its axis coinciding with said third axis, and third bearing means supporting said third shaft means for rotation about said third axis, said third bearing means being carried by said first shaft means and said third shaft means supporting said second bearing means.

6. In combination, means for resolving an applied force into a plurality of force components including first and second force components acting along first and second orthogonally related axes intersecting at a common point and third and fourth force components tending to produce rotation about said second axis and about a third axis intersecting said common point and disposed at right angles to said first and second axes, said resolving means comprising first shaft means having its axis coinciding with said first axis, first bearing means mounting the first shaft means for translation along said first axis, second shaft means having its axis coinciding with said second axis, second bearing means mounting said second shaft means for translation along said second axis and for rotation about said second axis, third shaft means having its axis coinciding with said third axis, third bearing means supportng said third shaft means for rotation about said third axis, said third bearing means being carried by said first shaft means and said third shaft means supporting said second bearing means, and adjustable means carried by said resolving means for statically balancing said resolving means with a body under test coupled to said second shaft means.

7. In combination, means for resolving an applied force into a plurality of force components including first and second force components acting along first and second orthogonally related axes intersecting at a common point and third and fourth force components tending to produce rotation about said second axis and about a third axis intersecting said common point and disposed at right angles to said first and second axes, said resolving means comprising first shaft means having its axis coinciding with said first axis, first bearing means mounting the first shaft means for translation along said first axis, second shaft means having its axis coinciding with said second axis, second bearing means mounting said second shaft means for translation along said second axis and for rotation about said second axis, third shaft means having its axis coinciding with said third axis, third bearing means supporting said third shaft means for rotation about said third axis, said third bearing means being carried by said first shaft means and said third shaft means supporting said second bearing means, and cooperating cross index means coupled to said first and second shaft means and said third shaft means for indicating an initial position of said shaft means, and means for applying forces to said shaft means to restore said shaft means to said initial position under dynamic conditions.

8. In combination, means for resolving an applied force into a plurality of force components including first and second force components acting along first and second orthogonally related axes intersecting at a common point and third and fourth force components tending to produce rotation about said second axis and about a third axis intersecting said common point and disposed at right angles to said first and second axes, said resolving means comprising first shaft means having its axis coinciding with said first axis, first bearing means mounting the first shaft means for translation along said first axis, second shaft means having its axis coinciding with said second axis, second bearing means mounting said second shaft means for translation along said second axis and for rotation about said second axis, third shaft means having its axis coinciding with said third axis, third bearing means supporting said third shaft means for rotation about said third axis, said third bearing means being carried by said first shaft means and said third shaft means supporting said second bearing means, and means for supplying cushions of air between said bearing means and shaft means for minimizing friction therebetween.

9. In combination, means for resolving an applied force into a plurality of force components including first and second force components acting along first and second orthogonally related axes intersecting at a common point and third and fourth force components tending to produce rotation about said second axis and about a third axis intersecting said common point and disposed at right angles to said first and second axes, said resolving means comprising first shaft means having its axis coinciding with said first axis, first bearing means mounting the first shaft means for translation along said first axis, second shaft means having its axis coinciding with said second axis, second bearing means mounting said second shaft means for translation along said second axis and for rotation about said second axis, third shaft means having its axis coinciding with said third axis, third bearing means supporting said third shaft means for rotation about said third axis, said third bearing means being carried by said first shaft means and said third shaft means supporting said second bearing means, and means for supplying cushions of air between said bearing means and shaft means for minimizing friction therebetween, the air supplying means comprising air passages extending in said first shaft means and in said third shaft means and leading to said second bearing means for supplying an air cushion between said second shaft means and said second bearing means.

10. Apparatus for measuring forces acting on a body comprising a support for the body, and means acting on said body for resolving forces acting on the body into first and second force components acting along first and second axes, and third, fourth and fifth force components tending to rotate said body about said first axis, said second axis and about a third axis, said means comprising first shaft means having its axis coinciding with said first axis, and first bearing means mounting the first shaft means for translation along said first axis and for rotation about said first axis, second shaft means having its axis coinciding with said second axis, second bearing means mounting said second shaft means for translation along said second axis and for rotation about said second axis, third shaft means having its axis coinciding with said third axis, third bearing means supporting said third shaft means for rotation about said third axis, said third bearing means being carried by said first shaft means, said third shaft means supporting said second bearing means, force measurement means for coupling to said first, second and third shaft means to measure the respective force components transmitted thereto from said support, and means for locking said first shaft means against rotation on said first axis while accommodating displacement of said first shaft means along said first axis.

References Cited by the Examiner
UNITED STATES PATENTS 2,448,528  9/1948  Heuver _____ 73—147
2,908,164  10/1959  Bamber _____ 73—147

RICHARD C. QUEISSER, *Primary Examiner.*

DAVID SCHONBERG, *Examiner.*